United States Patent Office 3,309,248
Patented Mar. 14, 1967

3,309,248
SOLID PROPELLANTS CONTAINING HYDRAZO-
NIUM AZIDE AND BORON COMPOUNDS
Douglas A. Rausch, Midland, Mich., assignor to The Dow
Chemical Company, Midland, Mich., a corporation of
Delaware
No Drawing. Filed Jan. 24, 1962, Ser. No. 169,181
6 Claims. (Cl. 149—19)

This invention relates to solid propellants and more particularly is concerned with new and novel solid rocket propellants employing solid boron containing fuels and hydrazonium azide ($N_2H_4 \cdot N_3H$) or hydrazonium azide hydrazide ($N_2H_4 \cdot N_3H \cdot N_2H_4$) as an oxidizer.

This propellant system in general as disclosed in a copending application Ser. No. 846,509, filed Oct. 14, 1959, employs the concept of utilizing in a rocket engine the thrust obtained by combustion of a boron fuel with a nitrogen oxidizing source material thereby forming solid boron nitride and hydrogen gas and liberating energy, this being the so-called "B-N" system. Unusually high thrusts are achieved with this system over that obtained in conventional carbon-hydrogen-oxygen propellant systems since undesirable high molecular weight gaseous exhaust products and compound dissociation at high temperatures which are inherent in conventional systems virtually are eliminated in the "B-N" system.

Now, unexpectedly, it has been found that certain specific combinations of solid nitrogen-hydrogen compounds and solid boron containing fuels can be utilized to provide solid rocket propellants which operate on the "B-N" concept and which exhibit desirably high specific impulses.

It is a principal object of the present invention, therefore, to provide a new and novel solid rocket propellant system which, upon combustion in a rocket engine, exhibits high specific impulses.

It is another object of the present invention to provide a solid rocket propellant system which operates on the "B-N" concept.

It is a further object of the present invention to provide a rocket propellant system wherein the oxidizer and fuel are compatible and which provide a propellant that can be readily and safely stored without undesirable degradation for extended periods of time prior to use.

It is another object of the present invention to provide a solid rocket propellant the oxidizer and fuel components of which both are solid at ordinary temperatures.

It is an additional object of the present invention to provide a nitrogen oxidizing source material which has a high positive heat of formation and which itself can supply large amounts of heat when used with a boron containing fuel in a "B-N" propellant composition.

These and other objects and advantages will be apparent from the detailed description presented hereinafter.

The instant propellant composition comprises a solid boron containing fuel and hydrazonium azide and/or hydrazonium azide hydrazide as the oxidizing source material.

The solid boron hydrides (e.g. decaborane), solid complex borohydrides (e.g. beryllium borohydride), decaborane·diammonia adduct and boron itself are especially suitable for use as fuels in the instant compositions.

The ratio of boron fuel to hydrazine azide adduct to be employed in the instant propellant composition ranges from about 0.9 to about 1.0 based on the stoichiometric quantities of boron and nitrogen in the fuel and oxidizer needed for boron nitride formation. Preferably stoichiometric quantities, based on the boron and nitrogen contents of the fuel and oxidizer, as needed for boron nitride formation will be employed.

The oxidizer and fuel can be formulated directly into a propellant grain utilizing conventional formulation and fabrication techniques as are employed in the solid propellant art. If desired, binders such as the high nitrogen thermoplastic poly(guanidines or aminoguanidines) and poly(guanidine- or aminoguanidine azides) prepared by autocondensation of the corresponding monomer also can be included in these new and novel compositions. Also high nitrogen containing polymers having N/C atom ratios greater than 2 prepared by condensing one or a mixture of an amino substituted guanidine or similar amine material or the corresponding autocondensed polymer with a formaldehyde or glyoal based material as disclosed in a copending application, Ser. No. 169,178, entitled, "High Nitrogen Polymers," filed Jan. 24, 1962, are highly satisfactory binders for use with the instant oxidizer and fuel combination.

If desired, other binders, i.e., carbon-hydrogen compounds as used in conventional systems, can be employed with the hydrazonium azide based oxidizer and boron fuel in the fabrication of the grain. Desirably the amount of these carbon-hydrogen based compounds will be kept low in order to achieve optimum performance of the grain since these conventional binders upon combustion introduce energy losses into the system through dissociation of the reaction products. Also, these materials produce impulse reducing high molecular weight gaseous exhaust products. Typical conventional binders which can be used include, for example, polyurethane, polyvinylchloride, polyethylene, polypropylene, nitrocellulose, polybutadiene acrylic acid and the like.

The following examples will serve to further illustrate the present invention but are not meant to limit it thereto.

*Example 1*

Stoichiometric quantities of hydrazonium azide $$(N_2H_4 \cdot N_3H)$$

and the diammonia adduct of decaborane ($B_{10}H_{18}N_2$) were mixed. These gave a physically compatible formulation which, when ignited, burned rapidly.

*Example 2*

Decaborane·diammoniate (7 moles) was mixed with 8 moles of hydrazonium azide hydrazide to give a formulation calculated to produce upon combustion only solid boron nitride and hydrogen gas. The resulting mixture was pressed into a solid grain and upon ignition burned readily. The theoretical specific impulse calculated for this system was 299 seconds.

In a manner similar to that disclosed for the foregoing examples, substantially stoichiometric quantities of amorphous boron and hydrazonium azide, as calculated for formation of boron nitride, can be formulated into a propellant grain using a small amount of a polyurethane binder. Beryllium borohydride and hydrazonium azide hydrazide can be blended into a solid propellant using a triaminoguanidine-formaldehyde polymer having a N/C ratio of about 2 or more as binder. Decaborane can be admixed with hydrazonium azide in a mole ratio of about 0.9 based on the boron and nitrogen content of the fuel and oxidizer for boron nitride formation to give a satisfactory propellant grain.

Various modifications can be made in the present invention without departing from the spirit or scope thereof for it is understood that I limit myself only as defined in the appended claims.

I claim:
1. A solid propellant which comprises a solid boron containing fuel selected from the group consisting of solid boron hydride, complex borohydrides, boron hydride·ammonia adducts and elemental boron and a solid oxidizing nitrogen source member selected from the group con- sisting of hydrazonium azide, hydrazonium azide hydrazide and mixtures thereof, the ratio of said boron fuel to said nitrogen oxidizer ranging from about 0.9 to about 1.0 of the stoichiometric quantities needed to produce boron nitride as determined from the elemental boron and nitrogen content of said fuel and oxidizer.

2. The propellant composition as defined in claim 1 wherein the fuel and oxidizer are bound by a high nitrogen containing organic polymer having an N/C atom ratio of greater than 2.

3. A rocket propellant composition comprising decaborane fuel and hydrazonium azide hydrazide oxidizer, said decaborane and hydrazonium azide hydrazide being present in the stoichiometric quantities needed for formation of boron nitride as based on the boron and nitrogen contents of said fuel and oxidizer.

4. A solid rocket propellant composition comprising decaborane·diammoniate fuel and hydrazonium azide hydrazide oxidizer, said decaborane·diammoniate and hydrazonium azide hydrazide being present in stoichiometric quantities needed for formation of boron nitride as based on the boron and nitrogen contents of said fuel and oxidizer.

5. A solid rocket propellant composition comprising decaborane fuel and hydrazonium azide oxidizer, said decaborane and hydrazonium azide being present in stoichiometric quantities needed for formation of boron nitride as based on the boron and nitrogen contents of said fuel and oxidizer.

6. A solid rocket propellant composition comprising decaborane·diammoniate fuel and hydrazonium azide oxidizer said decaborane·diammoniate and hydrazonium azide being present in stoichiometric quantities needed for formation of boron nitride as based on the boron and nitrogen contents of said fuel and oxidizer.

References Cited by the Examiner
UNITED STATES PATENTS 2,981,616  4/1961  Boyer _____ 149—35
3,006,743  10/1961  Fox et al. _____ 149—22 X

OTHER REFERENCES

Vernet-Lozet, Interavia, vol. 12, No. 8, Aug. 1957, pp. 799–801.

CARL D. QUARFORTH, *Primary Examiner.*

LEON D. ROSDOL, *Examiner.*

B. R. PADGETT, *Assistant Examiner.*